(12) United States Patent
Singer et al.

(10) Patent No.: US 10,273,381 B2
(45) Date of Patent: *Apr. 30, 2019

(54) BRANCHED POLYESTER POLYMERS AND COATINGS COMPRISING THE SAME

(71) Applicant: PPG Industries Ohio, Inc., Cleveland, OH (US)

(72) Inventors: Debra L. Singer, Wexford, PA (US); Dennis A. Simpson, Sarver, PA (US); John M. Dudik, Apollo, PA (US); Anthony M. Chasser, Allison Park, PA (US); Kam Lun Lock, Orpington (GB); Richard Woods, Saffron Walden (GB); Nigel Francis Masters, Romford (GB)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 15/615,952

(22) Filed: Jun. 7, 2017

(65) Prior Publication Data

US 2017/0267894 A1  Sep. 21, 2017

Related U.S. Application Data

(63) Continuation of application No. 12/752,570, filed on Apr. 1, 2010, now Pat. No. 9,708,504.

(51) Int. Cl.
*C09D 167/06* (2006.01)
*C08F 299/04* (2006.01)

(52) U.S. Cl.
CPC .......... *C09D 167/06* (2013.01); *C08F 299/04* (2013.01); *Y10T 428/1355* (2015.01); *Y10T 428/31786* (2015.04)

(58) Field of Classification Search
CPC ... C08G 63/181; C08F 299/04; C09D 167/02; C09D 167/06; Y10T 428/31507; Y10T 428/31681; Y10T 428/31876
See application file for complete search history.

(56) References Cited

U.S. PATENT DOCUMENTS 9,708,504 B2 *  7/2017  Singer ................. C08F 299/04
2014/0220354 A1 *  8/2014  Gao ..................... C09D 167/06
                                                           428/412

* cited by examiner

*Primary Examiner* — Robert S Jones
(74) *Attorney, Agent, or Firm* — Diane R. Meyers

(57) ABSTRACT

A polyester prepared by free radical polymerization of an unsaturated polyester prepolymer, wherein the polymerization occurs primarily by reaction of the unsaturation is disclosed. Coatings comprising the same are also disclosed, as are substrates coated at least in part with such coatings.

16 Claims, No Drawings

BRANCHED POLYESTER POLYMERS AND COATINGS COMPRISING THE SAME

CROSS-REFERENCE TO RELATED APPLICATION

This application is a continuation of application Ser. No. 12/752,570, filed Apr. 1, 2010.

FIELD OF THE INVENTION

The present invention relates to branched polyesters prepared by free radical polymerization of the double bonds of an unsaturated polyester prepolymer. The present invention further relates to coatings comprising such polyesters and substrates to which such coatings are applied.

BACKGROUND OF THE INVENTION

Conventional linear and branched polyester resins produced by the polycondensation of different combinations of polyols and polyacids have been widely used in the coatings industry. They have been used to coat a wide range of metallic and non-metallic substrates used in a number of different industries. These industries particularly include those in which flexible coatings are desired. Particularly suitable examples include substrates used in the packaging industry, coil coatings, and certain industrial and automotive coatings. Certain coatings, particularly in the packaging industry, must undergo extreme stresses in the course of preparation and use of the packaging containers. In addition to flexibility, packaging coatings may also need resistance to chemicals, solvents, pasteurization processes used in the packaging of beers and beverages, and may also need to withstand retort conditions commonly employed in food packaging. In the coil coating industry, the coil is unrolled, coated and re-rolled. The coating used must therefore have sufficient flexibility to withstand both the rolling process as well as the subsequent stamping or other formation process during which the coil is fabricated into the desired piece or end product; the durability of the paint on the end piece or product is also a factor. Similarly, it is often desired that coatings used in the automotive industry exhibit both flexibility and durability.

High molecular weight polyesters, which typically have good flexibility and resistance to mechanical deformation, can be made by controlling the ratio of polyol to polyacid and the extent of reaction. Such polymers, however, generally have a relatively low average functionality per chain, which limits their further use in coatings. Increasing the functionality, on the other hand, may result in a polyester having a lower molecular weight. Use of low molecular weight polyester resins in coatings can result in poor substrate adhesion, limited compatibility with other types of resins, and/or difficulty in achieving the required balance of chemical resistance and flexibility.

Polyesters having a high level of functionality without sacrificing molecular weight are therefore desired.

SUMMARY OF THE INVENTION

The present invention is directed to branched polyester polymers prepared by free radical polymerization of the double bonds of an unsaturated polyester polymer comprising: a) a hard segment; b) a polyol segment; and c) an unsaturated polycarboxylic acid and/or an anhydride and/or ester thereof. Coatings comprising such polyesters are also within the scope of the present invention, as are substrates coated at least in part with such coatings.

DETAILED DESCRIPTION OF THE INVENTION

The present invention is directed to branched polyester polymers generally comprising a reaction product comprising a hard segment, a polyol segment, and an unsaturated polycarboxylic acid and/or an anhydride and/or ester thereof. The reaction product is an unsaturated polyester, and is sometimes referred to herein as an "unsaturated polyester prepolymer", "reaction product" or like terms. Free radical initiators are used to initiate polymerization through the unsaturation of the unsaturated polyester prepolymer thereby resulting in a branched polyester.

The polyester prepolymer is prepared by reacting one or more monomers that contribute a "hard segment" with one or more polyols and one or more unsaturated polycarboxylic acids/anhydrides/esters. As used herein, "hard segment" and like terms refers to monomers or residues thereof that contribute rigidity rather than flexibility to the prepolymer. The hard segment can be the residue of, for example, a polyacid. "Polyacid" and like terms, as used herein, refers to a compound having two or more acid groups and includes the ester and/or anhydride of the acid. In certain embodiments, the polyacid is an aromatic acid or a cycloaliphatic acid, suitable examples of which include, but are not limited to, phthalic acid, isophthalic acid, 5-tert-butylisophthalic acid, tetrachlorophthalic acid, tetrahydrophthalic acid, naphthalene polycarboxylic acid, terephthalic acid, hexahydrophthalic acid, methylhexahydrophthalic acid, dimethyl terephthalate, cyclohexane dicarboxylic acid, chlorendic anhydride, 1,3-cyclohexane dicarboxylic acid, 1,4-cyclohexane dicarboxylic acid, tricyclodecane polycarboxylic acid, endomethylene tetrahydrophthalic acid, endoethylene hexahydrophthalic acid, cyclohexanetetra carboxylic acid, cyclobutane tetracarboxylic acid and esters and anhydrides thereof and/or combinations thereof. The monomer that contributes a hard segment is sometimes referred to herein as a "hard segment monomer".

In certain embodiments, one or more additional acids can also be used. Such acids can include, for example, other polyacids, monoacids, fatty acids, the esters and/or anhydrides of any of these acids and/or combinations thereof. Suitable polyacids include but are not limited to saturated polyacids such as adipic acid, azelaic acid, sebacic acid, succinic acid, glutaric acid, decanoic diacid, dodecanoic diacid and esters and anhydrides thereof. Suitable monoacids include but are not limited to cycloaliphatic carboxylic acids including cyclohexanecarboxylic acid, tricyclodecane carboxylic acid, camphoric acid, and aromatic mono carboxylic acids including benzoic acid and t-butylbenzoic acid; $C_1$-$C_{18}$ aliphatic carboxylic acids such as acetic acid, propanoic acid, butanoic acid, hexanoic acid, oleic acid, linoleic acid, undecanoic acid, lauric acid, isononanoic acid, other fatty acids, and hydrogenated fatty acids of naturally occurring oils; and/or esters and/or anhydrides of any of these.

The unsaturated polyester prepolymer reaction product further comprises a polyol. "Polyol" and like terms, as used herein, refers to a compound having two or more hydroxyl groups. The polyol used to form the polyol segment is sometimes referred to herein as the "polyol segment monomer". Polyols can also be chosen to contribute hardness to the prepolymer. Suitable polyols for use in the invention may be any polyols known for making polyesters. Examples include, but are not limited to, alkylene glycols, such as ethylene glycol, propylene glycol, diethylene glycol, dipropylene glycol, triethylene glycol, tripropylene glycol, hexylene glycol, polyethylene glycol, polypropylene glycol and neopentyl glycol; hydrogenated bisphenol A; cyclohexanediol; propanediols including 1,2-propanediol, 1,3-propanediol, butyl ethyl propanediol, 2-methyl-1,3-propanediol, and 2-ethyl-2-butyl-1,3-propanediol; butanediols including 1,4-butanediol, 1,3-butanediol, and 2-ethyl-1,4-butanediol; pentanediols including trimethyl pentanediol and 2-methylpentanediol; cyclohexanedimethanol; hexanediols including 1,6-hexanediol; caprolactonediol (for example, the reaction product of epsilon-caprolactone and ethylene glycol); hydroxy-alkylated bisphenols; polyether glycols, for example, poly(oxytetramethylene) glycol; trimethylol propane, pentaerythritol, di-pentaerythritol, trimethylol ethane, trimethylol butane, dimethylol cyclohexane, glycerol and the like. Suitable unsaturated polyols for use in the invention may be any unsaturated alcohols containing two or more hydroxyl groups. Examples include, but are not limited to, trimethylol propane monoallyl ether, trimethylol ethane monoallyl ether and prop-1-ene-1,3-diol. The polyol segment can also comprise some mono-ol, such as up to 10 weight %, or 5 weight %, based on the total weight of the polyol segment.

In certain embodiments, neither the hard segment nor polyol segment comprises unsaturation, either before or after formation of the reaction product.

The unsaturated polyester prepolymer further comprises an unsaturated polycarboxylic acid/anhydride/ester. Suitable unsaturated polyacids for use in the invention may be any unsaturated carboxylic acid containing two or more carboxy groups and/or an ester and/or anhydride thereof. Examples include, but are not limited to, maleic acid, fumaric acid, itaconic acid, citraconic acid, mesaconic acid and teraconic acid, and/or esters and/or anhydrides thereof. Where the unsaturated polyacid is in the form of an ester, these esters may be formed with any suitable alcohol, such as $C_1$-$C_{18}$ alkyl esters formed by reaction of a $C_1$-$C_{18}$ alcohol (e.g. methanol, ethanol, 1-propanol, 1-butanol, 2-butanol, isobutanol, 1-pentanol, 1-pentanol and 1-hexonol) with the polyacid. A particularly suitable unsaturated polyacid is maleic acid, maleic anhydride or a $C_1$-$C_6$ alkyl ester of maleic acid. In certain embodiments the unsaturated polycarboxylic acid/anhydride/ester comprises 3 to 10 weight % of the polyester prepolymer, such as 4 to 7 weight %, while in other embodiments it comprises ≥10 weight %, or ≥15 weight % of the polyester prepolymer.

The unsaturated polyester prepolymer can be prepared by any means known in the art. In one embodiment, the hard segment and polyol segment are prereacted to form what is sometimes referred to herein as a "polyol prepolymer", and then further reacted with the unsaturated polycarboxylic acid/anhydride/ester. In another embodiment, the hard segment, polyol segment and unsaturated polycarboxylic acid/anhydride/ester are all reacted together. The polyol is typically in excess as compared to the hard segment. For example, the ratio of reactive groups on the hard segment monomer to reactive groups on the polyol segment monomer may be 1:2, 2:3 or even higher. The higher the ratio, the higher the molecular weight of the reaction product. Because an excess of polyol is used, the reaction product has terminal hydroxyl functionality.

The unsaturated polyester prepolymer is then polymerized in the presence of a free radical initiator. Any free radical initiator typically used to initiate the polymerization of unsaturated compounds containing double bonds may be used in the free radical polymerization. For example, the free radical initiator can be an azo initiator or a peroxide initiator, such as tert-butyl peroxy-2-ethylhexanoate, tert-butyl peroxybenzoate or dibenzoyl peroxide. The ratio of initiator to unsaturated acid/anhydride/ester may be varied depending upon the degree of branching of the chains of the polyester that is desired. For example, the molar ratio of the initiator to the average number of double bonds per chain of the unsaturated acid/anhydride/ester may be 0.001 to 1.0, such as 0.01 to 0.9 or 0.5 to 1.

Accordingly, unsaturation from one acid/anhydride/ester moiety in the reaction product reacts with the unsaturation of another. The result is a branched polyester polymer. At least some if not all of the branches will have terminal hydroxyl groups. There may also be pendant functionality in the branched polyester as well, depending on the starting materials used. Typically, when initiator is used in conjunction with unsaturated acid/anhydride/esters, a linear polymer results. It was therefore a very surprising and unexpected result to achieve a branched polyester according to the present invention. It will be appreciated that the branching in the present invention is predominantly achieved through reaction of the unsaturation. It is possible to contribute a minor degree of branching through the use of a tri- or tetra-ol, although the amount of such compound should be selected to avoid gellation. It will be appreciated that the present methods for achieving branching through the use of polymerizing the unsaturation of a polycarboxylic acid and polyesters resulting therefrom are quite unique when compared with conventional branched polyesters, such as those made through the use of tri- or tetra-ols.

Depending upon the degree of control of the polymerization that is desired, the initiator can be added in different portions at different times. For example, all of the free radical initiator may be added at the start of the reaction, the initiator may be divided into portions and the portions added at intervals during the reaction, or the initiator may be added as a continuous feed. It will be appreciated that the addition of initiator at set intervals or in a continuous feed will result in a more controlled process than adding all of the initiator at the start.

Regardless of the manner in which the polyester prepolymer is made, whether a polyol prepolymer is formed first or the hard segment monomer and polyol segment monomer are reacted directly with the polycarboxylic acid/anhydride/ester, how and when the initiator is added, and the like, the resulting branch polyester will actually be a mixture of polyesters with varying degrees of unsaturation, chain length, branching and the like. Some of the resulting product may even be a monoester, but is still encompassed by the term "polyester" as used herein.

The temperature at which the free radical polymerization reaction is conducted may be varied depending on factors such as the composition of the unsaturated acid/anhydride/ester, the polyol segment monomer, the hard segment monomer, the initiator, the solvent and the properties that are desired in the polyester. Typically, the free radical polymerization is conducted at a temperature of from 50° C. to 150° C. In a typical polymerization, such as an acrylic polymerization, the higher temperature results in a higher concentration of free radical initiator, which in turn results in more chains being polymerized, each with a relatively low molecular weight. It has been surprisingly discovered in the present system, particularly when maleic is used, the higher the initiator concentration, the higher the molecular weight of the resulting polymer. This is a surprising result as those skilled in the art would not have expected the present polymerization to occur. Too much initiator, however, can lead to gellation. In certain embodiments, therefore, the polyester of the present invention is ungelled.

While any means can be used to effect the polymerization, for ease of handling, the free radical polymerization can be performed using solutions of the unsaturated acid/anhydride/ester and polyol prepolymer (or hard segment monomer and polyol segment monomer). Any solvent may be used, as long as it is able to dissolve the components including the free radical initiator to a sufficient degree to allow the polymerization to take place efficiently. Typical examples of suitable solvents include butyl glycol, propylene glycol mono methyl ether, methoxy propyl acetate and xylene. Preparation of the polyester in solvent is sometimes referred to herein as a "solvent-based system", which means that greater than 50%, such as up to 100%, of the solvent is an organic solvent, and less than 50% of the solvent, such as less than 20%, less than 10%, less than 5%, or less than 2% of the solvent is water.

Alternatively, the polyester can be prepared in a water-based system. A "water-based system" is one in which greater than 50%, such as up to 100%, of the solvent is water, and less than 50% of the solvent, such as less than 20%, less than 10%, less than 5%, or less than 2% of the solvent is an organic solvent. If the unsaturated polyester prepolymer has sufficient carboxylic acid groups, it may be converted into a water-diluted material by neutralization, or partial neutralization, with a suitable base, followed by addition of the water. Non-limiting examples of suitable bases for the neutralization include dimethylethanolamine, triethylamine and 2-amino-2-methyl propanol. This aqueous material can then be polymerized with free radicals as described above. Alternatively, the unsaturated polyester prepolymer may be mixed with surfactant and/or polymeric stabilizer material followed by mixing with water prior to free radical polymerization as described previously. It will also be apparent to those skilled in the art that these aqueous mixtures may contain additional organic cosolvents, examples of which include, but are not limited to, butyl glycol, butyl diglycolic and propylene glycol monomethyl ether.

In either the solvent-based or the water-based system, the resulting polyester can be solid or liquid.

As noted above, the polyesters of the present invention are formed by free radical polymerization via the double bonds of an unsaturated polyester prepolymer comprising a terminal hydroxyl group. In certain embodiments, two or more different unsaturated polyester prepolymers can be reacted together. "Different", in this context, means that one or more components used in two or more of unsaturated polyester prepolymers and/or the amount of one or more components used in two or more unsaturated polyester prepolymers can be different. For example, a polyester according to the present invention can be prepared by reaction of polyol prepolymers comprised of the same components, while in other embodiments they can be prepared by reaction of two or more polyol prepolymers that are formed by different components. That is, a first polyol prepolymer comprising a terminal hydroxyl group and a second polyol prepolymer comprising a terminal hydroxyl group are reacted with an unsaturated acid/anhydride/ester; the components used to make the first and second prepolymers can be different, or can have one or more different components. In this embodiment, the resulting polyester is likely to have random units derived from each type of prepolymer used. Thus, the present invention encompasses polyesters prepared by the same or different hard segment monomers, polyol segments monomers, and/or unsaturated acids/anhydrides/esters and/or the same or different amounts of any of these. Use of different polyol prepolymers, hard segment monomers, polyol segment monomers, unsaturated acids/anhydrides/esters and/or amounts may result in polyesters having different properties. In this manner, polyesters can be formed that have desirable properties deriving from the use of the particular components used for the reaction product.

As noted above, the polyester is formed by using free radical polymerization, wherein the unsaturation of the polycarboxylic acid/anhydride/ester moieties in the reaction product polymerize. In certain embodiments, the reaction is run such that substantially all of the unsaturation is reacted in the formation of the polyester, while in other embodiments the resulting polyester also comprises some degree of unsaturation. For example, the resulting polyester can comprise enough unsaturation to render the polyester reactive with other functional groups.

Because the branched polyester according to the present invention is formed primarily through the free radical polymerization of the unsaturation from the unsaturated acid/anhydride/ester, the terminal hydroxyl groups will remain unreacted in the polyester of the present invention. These unreacted hydroxyl groups can then be crosslinked with another component. Thus, the present invention is distinct from art in which gelled polyesters, that is extensively networked polyesters, are formed. The present polyesters are thermoset, and therefore also distinct from art that teaches thermoplastic polyesters.

In certain embodiments it may be desirable to convert some or all of the hydroxyl functionality on the unsaturated polyester prepolymer, such as before polymerization takes place, and/or on the branched polyester to another functionality. For example, the hydroxyl can be reacted with a cyclic anhydride to result in acid functionality. Acid esters can also be formed.

In certain other embodiments, the unsaturated polyester prepolymer may comprise linkages in addition to the ester linkages. For example, the polyester prepolymer may further comprise one or more urethane linkages. Urethane linkages could be introduced by reacting an excess of the polyol prepolymer or the unsaturated polyester polymer with a polyisocyanate. The resulting unsaturated polyester prepolymer will still have terminal functionality and unsaturation, but will have urethane linkages in addition to ester linkages. Other chemistries could also be introduced. Accordingly, in certain embodiments, the unsaturated polyester prepolymer comprises one or more linkages in addition to ester linkages.

In certain other embodiments, the use of unsaturated monomers other than the unsaturated polyacid/anhydride/ester of the reaction product is excluded. For example, the use of vinyl monomers such as (meth)acrylates, styrene, vinyl halides and the like can be excluded in certain embodiments. It will be appreciated therefore that the present branched polyesters are not polyester/acrylic graft copolymers, which are widely known in the art.

In certain embodiments, the present polyesters specifically exclude polyesters prepared from prepolymers that are formed by the reaction with aldehydes; thus, in this embodiment, acyl succinic acid polyesters are specifically excluded. Similarly, use of aldehyde in the solvent is specifically excluded in certain embodiments of the invention.

The polyesters of the present invention can have a relatively high molecular weight and functionality as compared to conventional linear polyester resins. Typically, the ratio of the weight average molecular weight ("Mw") of the branched polyester of the present invention to the Mw of the unsaturated polyester prepolymer is from 1.2 to 100, such as 4 or 5 to 50, although in certain embodiments, it can be as high as 1.2 to 500.

In certain embodiments, the branched polyesters of the invention may have an Mw as low as 600, or can have an Mw greater than 1000, such as greater than 5000, greater than 10,000, greater than 15,000, greater than 25,000, or greater than 50,000. Molecular weights between 80,000 and 100,000 are particularly suitable in some embodiments. Molecular weights higher than 100,000, up to 10,000,000, can be achieved. The molecular weight increase can be controlled by one or more factors such as the type and/or amount of initiator used, the temperature and the type and/or amount of solvent.

In addition to the molecular weight described above, the branched polyesters of the present invention can also have a relatively high functionality; in some cases the functionality is higher than would be expected for conventional polyesters having such molecular weights. The average functionality of the polyester can be 2.0 or greater, such as 2.5 or greater, 3.0 or greater, or even higher. "Average functionality" as used herein refers to the average number of functional groups on the branched polyester. The functionality of the branched polyester is measured by the number of hydroxyl groups that remain unreacted in the branched polyester, and not by the unreacted unsaturation. In certain embodiments, the hydroxyl value of the branched polyesters of the present invention can be from 10 to 500 mg KOH/gm, such as 30 to 250 mg KOH/gm. In certain embodiments, the present branched polyesters will have both high Mw and high functionality, such as a Mw of ≥15,000, such as 20,000 to 40,000, or higher than 40,000, and a functionality of ≥100 mg KOH/gm.

Perhaps even more remarkable are the viscosities that can be achieved with the present branched polyesters. The present polyester can have a viscosity of Z or less at 60% total solids, as measured by the Gardner-Holt bubble method. This is true even if the Mw is 40,000 to 50,000, or even higher than 50,000. Such a viscosity is typically unattainable with predominantly linear polyesters having molecular weights this high.

Because the polyester of the present invention comprises functionality, it is suitable for use in coating formulations in which the hydroxyl groups (and/or other functionality) are crosslinked with other resins and/or crosslinkers typically used in coating formulations. Thus, the present invention is further directed to a coating comprising a branched polyester according to the present invention and a crosslinker therefor. The crosslinker, or crosslinking resin or agent, can be any suitable crosslinker or crosslinking resin known in the art, and will be chosen to be reactive with the functional group or groups on the polyester. It will be appreciated that the coatings of the present invention cure through the reaction of the hydroxyl groups and/or other functionality and the crosslinker and not through the double bonds of the polycarboxylic acid/anhydride/ester moiety, to the extent any such unsaturation exists in the branched polyester.

Non-limiting examples of suitable crosslinkers include phenolic resins, amino resins, epoxy resins, isocyanate resins, beta-hydroxy (alkyl) amide resins, alkylated carbamate resins, polyacids, anhydrides, organometallic acid-functional materials, polyamines, polyamides, aminoplasts and mixtures thereof. In certain embodiments, the crosslinker is a phenolic resin comprising an alkylated phenol/formaldehyde resin with a functionality ≥3 and difunctional o-cresol/formaldehyde resins. Such crosslinkers are commercially available from Hexion as BAKELITE 6520LB and BAKELITE 7081LB.

Suitable isocyanates include multifunctional isocyanates. Examples of multifunctional polyisocyanates include aliphatic diisocyanates like hexamethylene diisocyanate and isophorone diisocyanate, and aromatic diisocyanates like toluene diisocyanate and 4,4'-diphenylmethane diisocyanate. The polyisocyanates can be blocked or unblocked. Examples of other suitable polyisocyanates include isocyanurate trimers, allophanates, and uretdiones of diisocyanates and polycarbodiimides such as those disclosed in U.S. patent application Ser. No. 12/056,304 filed Mar. 27, 2008, incorporated by reference in pertinent part herein. Suitable polyisocyanates are well known in the art and widely available commercially. For example, suitable polyisocyanates are disclosed in U.S. Pat. No. 6,316,119 at columns 6, lines 19-36, incorporated by reference herein. Examples of commercially available polyisocyanates include DESMODUR VP2078 and DESMODUR N3390, which are sold by Bayer Corporation, and TOLONATE HDT90, which is sold by Rhodia Inc.

Suitable aminoplasts include condensates of amines and/or amides with aldehyde. For example, the condensate of melamine with formaldehyde is a suitable aminoplast. Suitable aminoplasts are well known in the art. A suitable aminoplast is disclosed, for example, in U.S. Pat. No. 6,316,119 at column 5, lines 45-55, incorporated by reference herein.

In preparing the present coatings, the branched polyester and the crosslinker can be dissolved or dispersed in a single solvent or a mixture of solvents. Any solvent that will enable the formulation to be coated on a substrate may be used, and these will be well known to the person skilled in the art. Typical examples include water, organic solvent(s), and/or mixtures thereof. Suitable organic solvents include glycols, glycol ether alcohols, alcohols, ketones, and aromatics, such as xylene and toluene, acetates, mineral spirits, naphthas and/or mixtures thereof. "Acetates" include the glycol ether acetates. In certain embodiments, the solvent is a non-aqueous solvent. "Non-aqueous solvent" and like terms means that less than 50% of the solvent is water. For example, less than 10%, or even less than 5% or 2%, of the solvent can be water. It will be understood that mixtures of solvents, including or excluding water in an amount of less than 50%, can constitute a "non-aqueous solvent". In other embodiments, the coating is aqueous or water-based. This means that 50% or more of the solvent is water. These embodiments have less than 50%, such as less than 20%, less than 10%, less than 5% or less than 2% solvent.

In certain embodiments, the coatings of the present invention further comprise a curing catalyst. Any curing catalyst typically used to catalyze crosslinking reactions between polyester resins and crosslinkers, such as phenolic resins, may be used, and there are no particular limitations on the catalyst. Examples of such a curing catalyst include phosphoric acid, alkyl aryl sulphonic acid, dodecyl benzene sulphonic acid, dinonyl naphthalene sulphonic acid, and dinonyl naphthalene disulphonic acid.

If desired, the coating compositions can comprise other optional materials well known in the art of formulating coatings in any of the components, such as colorants, plasticizers, abrasion resistant particles, anti-oxidants, hindered amine light stabilizers, UV light absorbers and stabilizers, surfactants, flow control agents, thixotropic agents, fillers, organic cosolvents, reactive diluents, catalysts, grind vehicles, and other customary auxiliaries.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water-miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemicals, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application Ser. No. 60/482,167 filed Jun. 24, 2003, and U.S. patent application Ser. No. 11/337,062, filed Jan. 20, 2006, which is also incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004, and incorporated herein by reference.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

An "abrasion resistant particle" is one that, when used in a coating, will impart some level of abrasion resistance to the coating as compared with the same coating lacking the particles. Suitable abrasion resistant particles include organic and/or inorganic particles. Examples of suitable organic particles include but are not limited to diamond particles, such as diamond dust particles, and particles formed from carbide materials; examples of carbide particles include but are not limited to titanium carbide, silicon carbide and boron carbide. Examples of suitable inorganic particles, include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Particles of any size can be used, as can mixtures of different particles and/or different sized particles. For example, the particles can be microparticles, having an average particle size of 0.1 to 50, 0.1 to 20, 1 to 12, 1 to 10, or 3 to 6 microns, or any combination within any of these ranges. The particles can be nanoparticles, having an average particle size of less than 0.1 micron, such as 0.8 to 500, 10 to 100, or 100 to 500 nanometers, or any combination within these ranges.

In certain embodiments, the polyesters of the present invention are used as coating additives. For example, it has been discovered that the present polyesters can replace all or part of the sag control agent, such as cellulose esters, used in coating formulations comprising metallic flake. Proper orientation of the metallic flake in the cured coating has been observed with coatings of the present invention, when the branched polyester comprises as little as 1.0 weight % up to 80.0 weight % of the total solids weight of the coating, such as 20 to 60 weight % or 45 to 55 weight %. Particularly good results are observed when the Mw weight of the branched polyester is 80,000 or greater, such as 90,000 to 100,000.

It will be appreciated that the polyester of the present invention and crosslinker therefor can form all or part of the film-forming resin of the coating. In certain embodiments, one or more additional film-forming resins are also used in the coating. For example, the coating compositions can comprise any of a variety of thermoplastic and/or thermosetting compositions known in the art. The coating compositions may be water-based or solvent-based liquid compositions, or alternatively, may be in solid particulate form, i.e. a powder coating.

Thermosetting or curable coating compositions typically comprise film-forming polymers or resins having functional groups that are reactive with either themselves or a crosslinking agent. The additional film-forming resin can be selected from, for example, acrylic polymers, polyester polymers, polyurethane polymers, polyamide polymers, polyether polymers, polysiloxane polymers, copolymers thereof, and mixtures thereof. Generally, these polymers can be any polymers of these types made by any method known to those skilled in the art. Such polymers may be solvent-borne or water-dispersible, emulsifiable, or of limited water solubility. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups) mercaptan groups, and combinations thereof. Appropriate mixtures of film-forming resins may also be used in the preparation of the present coating compositions.

Thermosetting coating compositions typically comprise a crosslinking agent that may be selected from any of the crosslinkers described above. In certain embodiments, the present coatings comprise a thermosetting film-forming polymer or resin and a crosslinking agent therefor and the crosslinker is either the same or different from the crosslinker that is used to crosslink the polyester. In certain other embodiments, a thermosetting film-forming polymer or resin having functional groups that are reactive with themselves are used; in this manner, such thermosetting coatings are self-crosslinking.

The coatings of the present invention may comprise 1 to 100, such as 10 to 90 or 20 to 80 weight %, with weight % based on total solid weight of the coating, of the polyester of the present invention. The coating compositions of the present invention may also comprise 0 to 90, such as 5 to 60 or 10 to 40 weight %, with weight % based on total solids weight of the coating, of a crosslinker for the branched polyester. Additional components, if used, may comprise 1 weight %, up to 70 weight %, or higher, with weight % based on total solids weight of the coating.

Coating formulations according to the present invention can have a significant increase in cure response and/or bending flexibility, and/or a noticeable improvement in mechanical deformation and/or sterilization resistance, as compared with conventional polyesters. It has been surprisingly discovered that the durability of the present coatings is quite high; that is, the present coatings can have a durability characterized in that the gloss retention after 2000 hours in a xenon arc weatherometer is ≥70%. The present coatings also show both good flexibility and hardness. More specifically, the coatings of the present invention can have a flexibility as measured by Mandrel bend (sometimes referred to as wedge bend) according to ASTM Method D 522-93 of 20 to 25% spotty failure, or even 15 to 20% spotty failure. The present coatings can also have a hardness as measured by the Fischer Micro-hardness test of 80 to 140 $N/mm^2$, such as 110-140 $N/mm^2$. It will be appreciated by those skilled in the art that achieving of this level of flexibility and hardness in the same coating is a remarkable accomplishment. Typically, one property, either flexibility or hardness, is sacrificed to achieve the other property.

In certain embodiments of the present invention, the polyester and/or coating comprising the polyester are substantially epoxy-free. As used herein, the term "substantially epoxy-free" means that the polyester and/or coating comprising the same are substantially free from epoxy, epoxy residue, oxirane rings or residues of oxirane rings, bisphenol A, BADGE or adducts of BADGE, bisphenol F, BFDGE or adducts of BFDGE. In certain other embodiments of the present invention, the polyester and/or coating comprising the same are substantially free from bisphenol or residues thereof, including bisphenol A, bisphenol F, BADGE, and BFDGE. The polyester and/or the coatings comprising the same can also be substantially free of polyvinyl chloride or related halide-containing vinyl polymers. "Substantially free" means that the polyester and/or coating comprise 10 weight % or less, such as 5 weight % or less, 2 weight % or less or 1 weight % or less, based on total solids weight, of the compounds in any of the forms listed herein or otherwise known. Thus, it will be understood that polyesters and/or coatings according to the present invention can comprise trace or minor amounts of these components and still be "substantially free" of them. In yet other embodiments, the polyesters and/or coatings comprising the same are completely free of any of the compounds listed above, or derivatives thereof.

The present coatings can be applied to any substrates known in the art, for example, automotive substrates, industrial substrates, packaging substrates, wood flooring and furniture, apparel, electronics including housings and circuit boards, glass and transparencies, sports equipment including golf balls, and the like. These substrates can be, for example, metallic or non-metallic. Metallic substrates include tin, steel, tin-plated steel, chromium passivated steel, galvanized steel, aluminum, aluminum foil. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) ("PET"), polycarbonate, polycarbonate acrylobutadiene styrene ("PC/ABS"), polyamide, wood, veneer, wood composite, particle board, medium density fiberboard, cement, stone, glass, paper, cardboard, textiles, leather both synthetic and natural, and the like. The substrate can be one that has been already treated in some manner, such as to impart visual and/or color effect.

The coatings of the present invention can be applied by any means standard in the art, such as electrocoating, spraying, electrostatic spraying, dipping, rolling, brushing, and the like.

The coatings can be applied to a dry film thickness of 0.04 mils to 4 mils, such as 0.3 to 2 or 0.7 to 1.3 mils. In other embodiments the coatings can be applied to a dry film thickness of 0.1 mils or greater, 0.5 mils or greater 1.0 mils or greater, 2.0 mils or greater, 5.0 mils or greater, or even thicker. The coatings of the present invention can be used alone, or in combination with one or more other coatings. For example, the coatings of the present invention can comprise a colorant or not and can be used as a primer, basecoat, and/or top coat. For substrates coated with multiple coatings, one or more of those coatings can be coatings as described herein. The present coatings can also be used as a packaging "size" coating, wash coat, spray coat, end coat, and the like.

It will be appreciated that the coatings described herein can be either one component ("1K"), or multi-component compositions such as two component ("2K") or more. A 1K composition will be understood as referring to a composition wherein all the coating components are maintained in the same container after manufacture, during storage, etc. A 1K coating can be applied to a substrate and cured by any conventional means, such as by heating, forced air, and the like. The present coatings can also be multi-component coatings, which will be understood as coatings in which various components are maintained separately until just prior to application. As noted above, the present coatings can be thermoplastic or thermosetting.

In certain embodiments, the coating is a clearcoat. A clearcoat will be understood as a coating that is substantially transparent. A clearcoat can therefore have some degree of color, provided it does not make the clearcoat opaque or otherwise affect, to any significant degree, the ability to see the underlying substrate. The clearcoats of the present invention can be used, for example, in conjunction with a pigmented basecoat. The clearcoat can be formulated as is know in the coatings art.

In certain embodiments, the coating is used as a primer, such as an anti-chip primer. Anti-chip primer coating compositions are known in the automotive OEM industry, and are generally applied onto various locations of a vehicle such as the leading edges of doors, fenders, hoods and on the A pillar of a vehicle prior to application of a primer-surfacer coating composition over the entire vehicular body. In certain embodiments, the anti-chip primer coating composition is not cured prior to application of one or more subsequent coating layers. Rather, the anti-chip primer coating composition is subjected to an ambient flash step, wherein it is exposed to ambient air for a certain period of time in order to allow for the evaporation of a portion of organic solvent from the anti-chip coating composition. Cure of the anti-chip primer coating composition occurs simultaneously with the one or more additional coating layers (co-cured). Primers according to the present invention, including anti-chip primers, will typically comprise some colorant and will typically be used with one or more additional coating layers such as after an electrocoat layer and before a primer surface layer, a colored basecoat layer a clearcoat layer and the like.

In certain other embodiments the coating comprises a colorant, such as a pigmented basecoat used in conjunction with a clearcoat, or as a pigmented monocoat. Such coating layers are used, for example, in the automotive industry to impart a decorative and/or protective finish to the coated substrate. Accordingly, the present invention is further directed to a substrate coated at least in part with the coating of the present invention, wherein the substrate comprises part of a vehicle. "Vehicle" is used herein in its broadest sense and includes all types of vehicles, such as but not limited to cars, trucks, buses, vans, golf carts, motorcycles, bicycles, railroad cars and the like. It will be appreciated that the portion of the vehicle that is coated according to the present invention may vary depending on why the coating is being used. For example, anti-chip primers may be applied to some of the portions of the vehicle as described above. When used as a colored basecoat or monocoat, the present coatings will typically be applied to those portions of the vehicle that are visible such as the roof, hood, doors trunk lid and the like, but may also be applied to other areas such as inside the trunk, inside the door and the like. Clearcoats will typically be applied to the exterior of a vehicle.

Coil coatings, having wide application in many industries, are also within the scope of the present invention; the present coatings are particularly suitable as coil coatings due to their unique combination of flexibility and hardness, as discussed above. Coil coatings also typically comprise a colorant.

The coatings of the present invention are also suitable for use as packaging coatings. The application of various pretreatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. Contact between the metal and a food or beverage, for example, can lead to corrosion of a metal container, which can then contaminate the food or beverage. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans. Certain coatings of the present invention are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements should also be resistant to popping, corrosion, blushing and/or blistering.

Accordingly, the present invention is further directed to a package coated at least in part with any of the coating compositions described above. In certain embodiments, the package is a metal can. The term "metal can" includes any type of metal can, container or any type of receptacle or portion thereof used to hold something. One example of a metal can is a food can; the term "food can(s)" is used herein to refer to cans, containers or any type of receptacle or portion thereof used to hold any type of food and/or beverage. The term "metal can(s)" specifically includes food cans and also specifically includes "can ends", which are typically stamped from can end stock and used in conjunction with the packaging of beverages. The term "metal cans" also specifically includes metal caps and/or closures such as bottle caps, screw top caps and lids of any size, lug caps, and the like. Metal cans can be used to hold other items as well as food and/or beverage, including but not limited to personal care products, bug spray, spray paint, and any other compound suitable for packaging in an aerosol can. The cans can include "two-piece cans" and "three-piece cans" as well as drawn and ironed one-piece cans; such one-piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The coating can be applied to the interior and/or the exterior of the package. For example, the coating can be rollcoated onto metal used to make a two-piece food can, a three-piece food can, can end stock and/or cap/closure stock. In some embodiments, the coating is applied to a coil or sheet by roll coating; the coating is then cured by radiation and can ends are stamped out and fabricated into the finished product, i.e. can ends. In other embodiments, the coating is applied as a rim coat to the bottom of the can; such application can be by roll coating. The rim coat functions to reduce friction for improved handling during the continued fabrication and/or processing of the can. In certain embodiments, the coating is applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans.

Substrates coated according to the present invention can be coated with any of the compositions described above by any means known in the art, such as spraying, rolling, dipping, brushing, flow coating and the like; the coating may also be applied by electrocoating when the substrate is conductive. The appropriate means of application can be determined by one skilled in the art based upon the type of substrate being coated and the function for which the coating is being used. The coatings described above can be applied over the substrate as a single layer or as multiple layers with multiple heating stages between the application of each layer, if desired. After application to the substrate, the coating composition may be cured by any appropriate means.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "a" polyester, "an" unsaturated acid/anhydride/ester, "a" polyol pre-polymer, "a" hard segment, "a" polyol segment, "a" crosslinker, and the like, one or more of each of these and any other components can be used. As used herein, the term "polymer" refers to oligomers and both homopolymers and copolymers, and the prefix "poly" refers to two or more. Including and like terms means including but not limited to. When ranges are given, any endpoints of those ranges and/or numbers within those ranges can be combined within the scope of the present invention.

EXAMPLES

The following examples are intended to illustrate the invention and should not be construed as limiting the invention in any way.

Example 1

A polyester was prepared from the following ingredients as described below:

| Ingredients | Parts by Weight (grams) |
| --- | --- |
| 2-Methyl-1,3-propanediol | 900 |
| Neopentyl glycol | 520 |
| Isophthalic acid | 1661 |
| Maleic anhydride | 245 |
| Butylstannoic acid | 3.33 |
| Triphenyl phosphite | 1.66 |

A total of 900 grams of 2-methyl-1,3-propanediol, 520 grams of neopentyl glycol, 1661 grams of isophthalic acid, 245 grams of maleic anhydride, 3.33 grams of butylstannoic acid and 1.66 grams of triphenyl phosphite were added to a suitable reaction vessel equipped with a stirrer, temperature probe, a steam heated reflux condenser with a distillation head and a nitrogen sparge. The contents of the flask were heated to 90° C. At that temperature, the contents underwent an exotherm to 125° C. The reaction was then heated to 174° C. At this time water began to be evolved from the reaction. The temperature of the reaction mixture was raised to 200° C. and then 210° C. and finally to 220° C. and held at that temperature until 405 grams of water had been distilled and the acid value of the reaction mixture was found to be 11.8. The contents of the reactor were cooled and poured out. The final material was a solid material with a measured solids of 99.5%, a hydroxyl value of 95.8 and a weight average molecular weight of 3144 as measured against a polystyrene standard.

Example 2

A polyester was prepared from the following ingredients as described below:

| Ingredients | Parts by Weight (grams) |
| --- | --- |
| Example 1 | 1800 |
| t-Butyl peroctoate (50% solution) | 18 |
| t-Butyl peroctoate (50% solution) | 18 |
| Dowanol PM Acetate | 596 |
| Dowanol PM | 596 |

A total of 1800 grams of polyester Example 2a was placed in a suitable reaction vessel equipped with a stirrer, temperature probe, reflux condenser and a nitrogen blanket. A total of 596 grams of Dowanol PM Acetate and 524 grams of Dowanol PM were added to the resin and mixed well. The contents of the flask were heated to 120° C. A mixture of 18 grams of t-butyl peroctoate (50% solution) mixed with 36 grams of Dowanol PM was added drop wise to the reactor contents over a period of 15 minutes. The batch was then held for 1 hour at 120° C. A second mixture consisting of 18 grams of t-butyl peroctoate (50% solution mixed with 36 grams of Dowanol PM) was then added drop wise to the reactor contents over a period of 15 minutes. The reactor contents were again held for 1 hour at 120° C. The reactor contents were then cooled and poured out. The final resin had a measured solids of 60%, a Gardner-Holt viscosity of X and a weight average molecular weight of 13833 as measured against a polystyrene standard.

Example 3a

A polyester was prepared from the following ingredients as described below:

| Ingredients | Parts by Weight (grams) |
| --- | --- |
| 2-Methyl-1,3-propanediol | 810 |
| Neopentyl glycol | 468 |
| Isophthalic acid | 1495 |
| Benzoic acid | 158 |
| Maleic anhydride | 220 |
| Butylstannoic acid | 3.15 |
| Triphenyl phosphite | 1.58 |

A total of 810 grams of 2-methyl-1,3-propanediol, 468 grams of neopentyl glycol, 1495 grams of isophthalic acid, 158 grams of benzoic acid, 220 grams of maleic anhydride, 3.15 grams of butylstannoic acid and 1.58 grams of triphenyl phosphite were added to a suitable reaction vessel equipped with a stirrer, temperature probe, a steam heated reflux condenser with a distillation head and a nitrogen sparge. The contents of the flask were heated to 90° C. At that temperature, the contents underwent an exotherm to 127° C. The reaction was then heated to 174° C. At this time water began to be evolved from the reaction. The temperature of the reaction mixture was raised to 200° C. and then 210° C. and finally to 220° C. and held at that temperature until 356 grams of water had been distilled and the acid value of the reaction mixture was found to be 9.2. The contents of the reactor were cooled and poured out. The final material was a solid material with a measured solids of 99.7%, a hydroxyl value of 66 and a weight average molecular weight of 3109 as measured against a polystyrene standard.

Example 3

A polyester was prepared from the following ingredients as described below:

| Ingredients | Parts by Weight (grams) |
| --- | --- |
| Example 3a | 1800 |
| t-Butyl peroctoate (50% solution) | 18 |
| t-Butyl peroctoate (50% solution) | 18 |
| Dowanol PM Acetate | 596 |
| Dowanol PM | 596 |

A total of 1800 grams of polyester Example 3a was placed in a suitable reaction vessel equipped with a stirrer, temperature probe, reflux condenser and a nitrogen blanket. A total of 596 grams of Dowanol PM Acetate and 524 grams of Dowanol PM were added to the resin and mixed well. The contents of the flask were heated to 120° C. A mixture of 18 grams of t-butyl peroctoate (50% solution) mixed with 36 grams of Dowanol PM was added drop wise to the reactor contents over a period of 15 minutes. The batch was then held for 1 hour at 120° C. A second mixture consisting of 18 grams of t-butyl peroctoate (50% solution mixed with 36 grams of Dowanol PM) was then added drop wise to the reactor contents over a period of 15 minutes. The reactor contents were again held for 1 hour at 120° C. The reactor contents were then cooled and poured out. The final resin had a measured solids of 61%, a Gardner-Holt viscosity of X and a weight average molecular weight of 14584 as measured against a polystyrene standard.

Example 4

Table 1 lists the ingredients used to make two clearcoats (Sample 1 and 2) and pigmented basecoat (Sample 3) using the free radical polyester resins of the present invention:

TABLE 1

| Component | Sample 1 | Sample 2 | Sample 3 |
| --- | --- | --- | --- |
| SOLVESSO 100[1] | 32.35 | 31.81 | 32.68 |
| DOWANOL DPM[2] | 32.35 | 31.81 | 22.68 |
| EVERSORB 74[3] | 2.50 | 2.50 | 2.50 |
| EVERSORB 93[4] | 0.50 | 0.50 | 0.50 |
| SETAMINE US 138[5] | 42.86 | 42.86 | 42.86 |
| Polyester Resin of Example 2[6] | 116.09 | 0 | 88.91 |
| Polyester Resin of Example 3[7] | 0 | 114.75 | 0 |
| Flow Additive[8] | 0.83 | 0.83 | 0.83 |
| Dodecylbenzene Sulfonic Acid[9] | 0.57 | 0.57 | 0.57 |
| White Pigment Paste[10] | 0 | 0 | 97.01 |

[1]Aromatic solvent available from Exxon Corporation.
[2]Glycol ether solvent available from Dow Chemical Company.
[3]UV Absorber available from Everlight Chemical Industrial Corporation.
[4]Hindered Amine Light Stabilizer available from Everlight Chemical Industrial Corporation.
[5]Melamine Resin available from Nuplex Resins.
[6]Polyester Resin of Example 2: 27.0% 2-Methyl-1,3-propanediol, 15.6% Neopentyl Glycol, 49.9% Isophthalic Acid and 7.4% Maleic Anhydride with Mw = 13,833.
[7]Polyester Resin of Example 3: 25.7% 2-Methyl-1,3-propanediol, 14.8% Neopentyl Glycol, 5.0% Benzoic Acid, 47.4% Isophthalic Acid and 7.0% Maleic Anhydride with Mw = 14,584.
[8]Poly(Butyl Acrylate) flow additive available from DuPont.
[9]Acid catalyst available from Cytec Industries.
[10]White pigment paste using 67% TIONA 595 Titanium Dioxide Pigment from MILLENIUM INORGANICS, 10.3% PPG Polyester Resin and 4.4% FM 003V60 Melamine Resin from CYTEC INDUSTRIES made in solvent to 83.9% weight solids.

The clearcoats were spray applied using a SPRAYMATION machine onto 4 inch by 12 inch steel panels coated with cured ELECTROCOAT (ED 6060)/PPG HP77224ER Primer available from ACT Test Panels, Inc. of Hillsdale, Mich. A waterborne black color coat (HWH-9517), available from PPG Industries, was spray applied onto the E-Coat panels with a total dry film thickness of 0.5 mils before application of the clear. The waterborne black color coat was dehydrated for ten minutes at 176° F. before clear application. After clear application and a ten minute room temperature flash, the entire layering system was baked for thirty minutes at 285° F.

The white pigmented coatings were spray applied using a SPRAYMATION machine onto 4 inch by 12 inch steel panels coated with cured ELECTROCOAT (ED 6060)/PPG HP77224ER Primer available from ACT Test Panels, Inc. of Hillsdale, Mich. A ten minute room temperature flash was allowed after the white pigmented coatings were applied to the substrate. The coatings were baked for thirty minutes at 285° F.

Table 2 provides a summary of the appearance and physical properties obtained for each of the above samples.

TABLE 2

| SAMPLE | DFT[11] (mils) | 20° GLOSS[12] | TRICOR DOI[13] | FISCHER Micro- Hardness[14] | 20° Gloss after Car Wash Test[15] | Resistance to Sulfuric Acid[16] |
|---|---|---|---|---|---|---|
| CLEAR COATINGS | | | | | | |
| 1 | 1.7 | 96 | 97 | 160 | 66 | 1 |
| 2 | 1.7 | 98 | 95 | 158 | 63 | 3 (gloss loss & cracks) |
| WHITE PIGMENTED COATINGS | | | | | | |
| 3 | 1.7 | 77 | 94 | 193 | 64 | 2 (gloss loss) |

[11]Dryfilm thickness measured using FISCHER DELTACOPE made by FISCHER TECHNOLOGY, INC. of Windsor, CT.
[12]NOVO GLOSS statistical 20° Glossmeter available from Paul N. Gardner Company, Inc. of Pompano Beach, Florida.
[13]DOI meter available from TRICOR Systems, Inc. of Elgin, Illinois.
[14]Microhardness Instrument available from Helmut Fischer GMBH & Company of Sindelfingen, Germany.
[15]Lab Car Wash test machine available from AMTEC-KISTLER GmbH of Prittriching, Germany. The 20° Gloss is measured before and after 10 cycles of lab car washing.
[16]A 400 microliter drop of 38% Sulfuric Acid was placed on each panel for three days and the resulting damage was recorded. The rating scale is: 0 = OK/1 = Light Ring/2 = Ring/3 = Light whitening and/or blistering/4 = white & swollen, matte, strong blistering/5 = total damage.

The results shown in Table 2 demonstrate that both clear and pigmented coatings having adequate properties can be prepared according to the present invention.

Example 5

A polyester was prepared from the following ingredients as described below:

| Ingredients | Parts by Weight (grams) |
|---|---|
| 1,3-Butanediol | 1218 |
| Isophthalic acid | 1495 |
| Maleic anhydride | 221 |
| Butylstannoic acid | 2.93 |
| Triphenyl phosphite | 1.47 |

A total of 1218 grams of 1,3-butanediol, 1495 grams of isophthalic acid, 221 grams of maleic anhydride, 2.33 grams of butylstannoic acid and 1.47 grams of triphenyl phosphite were added to a suitable reaction vessel equipped with a stirrer, temperature probe, a steam heated reflux condenser with a distillation head and a nitrogen sparge. The contents of the flask were heated to 90 C. The contents then underwent an exotherm to 115° C. The reaction was then heated to 181° C. At this time water began to be evolved from the reaction. The temperature of the reaction mixture was raised to 200° C. and then 210° C. and finally to 220° C. and held at that temperature until 385 grams of water had been distilled and the acid value of the reaction mixture was found to be 11.4. The contents of the reactor were cooled and poured out. The final material was a solid material with a measured solids of 98%, a hydroxyl value of 82 and a weight average molecular weight of 3239 as measured against a polystyrene standard.

Example 6

A polyester resin was prepared from the following ingredients as described below:

| Ingredients | Parts by Weight (grams) |
|---|---|
| Polyester from Example 5 | 500 |
| t-Butyl peroctoate (50% solution) | 5 |
| t-Butyl peroctoate (50% solution) | 5 |
| Dowanol PM | 165 |
| Dowanol PM Acetate | 165 |

A total of 500 grams of polyester from Example 6, 126 grams of Dowanol PM and 166 grams of Dowanol PM Acetate were added to a suitable reaction vessel equipped with a stirrer, temperature probe, a water chilled reflux condenser and flushed with nitrogen gas. The contents of the flask were heated to 120° C. At that time, 5 grams of t-butyl peroctoate mixed with 20 grams of Dowanol PM were added to the reactor over 15 minutes. The contents of the reactor were then held at 120° C. for 1 hour. At that time, an additional 5 grams of t-butyl peroctoate mixed with 20 grams of Dowanol PM were added to the reactor. The contents of the reactor were held at 120° C. for 2 hours and then cooled and the contents poured out. The final material was a solution with a measured solids of 61%, an acid value of 5.7, a viscosity of Z1 and a weight average molecular weight of 67704 as measured against a polystyrene standard.

Example 7

A polyester was prepared from the following ingredients as described below:

| Ingredients | Parts by Weight (grams) |
|---|---|
| 1,3-Butanediol | 460 |
| Isophthalic acid | 865 |
| Butylstannoic acid | 1.02 |

A total of 460 grams of 1,3-butanediol, 565 grams of isophthalic acid and 1.02 grams of butylstannoic acid were added to a suitable reaction vessel equipped with a stirrer, temperature probe, a steam heated reflux condenser with a distillation head and a nitrogen sparge. The contents of the flask were heated to 90° C. The contents then underwent an exotherm to 126° C. The reaction was then heated to 201° C. At this time water began to be evolved from the reaction. The temperature of the reaction mixture was raised to 211° C. and finally to 221° C. and held at that temperature until 122 grams of water had been distilled and the acid value of the reaction mixture was found to be 10.3. The contents of the reactor were cooled and poured out. The final material was a solid material with a measured solids of 96%, a hydroxyl value of 196 and a weight average molecular weight of 1448 as measured against a polystyrene standard.

Example 8

A polyester was prepared from the following ingredients as described below:

| Ingredients | Parts by Weight (grams) |
|---|---|
| Polyester from Example 7 | 532 |
| Maleic anhydride | 49 |
| 2,6-Di-t-butyl-4-methylphenol | 0.17 |

A total of 532 grams of the polyester of Example 7, 49 grams of maleic anhydride and 0.17 grams of 2,6-di-t-butyl-4-methylphenol were added to a suitable reaction vessel equipped with a stirrer, temperature probe, a steam heated reflux condenser with a distillation head and a nitrogen sparge. The contents of the flask were heated to 92° C. The contents then underwent an exotherm to 138° C. The reaction was then heated to 201° C. At this time water began to be evolved from the reaction. The temperature of the reaction mixture was raised to 203° C. and held at that temperature until 2 grams of water had been distilled and the acid value of the reaction mixture was found to be 8.2. The contents of the reactor were cooled and poured out. The final material was a solid material with a measured solids of 100%, a hydroxyl value of 65 and a weight average molecular weight of 4073 as measured against a polystyrene standard.

Example 9

A polyester was prepared from the following ingredients as described below:

| Ingredients | Parts by Weight (grams) |
|---|---|
| Polyester from Example 8 | 350 |
| t-Butyl peroctoate | 21 |
| t-Butyl peroctoate | 21 |
| Xylene | 176 |

A total of 350 grams of Example 8 and 155 grams of xylene were added to a suitable reaction vessel equipped with a stirrer, temperature probe, a water chilled reflux condenser and flushed with nitrogen gas. The contents of the flask were heated to 120° C. At that time, 21 grams of t-butyl peroctoate mixed with 10.5 grams of xylene were added to the reactor. The contents of the reactor were then held at 120° C. for 1 hour. At that time, an additional 21 grams of t-butyl peroctoate mixed with 10.5 grams of xylene were added to the reactor. The contents of the reactor were held at 120° C. for 1 hour and then cooled and the contents poured out. The final material was a solution with a measured solids of 61%, an acid value of 2.7, a viscosity of Z3-Z4 and a weight average molecular weight of 120,432 as measured against a polystyrene standard.

Example 10

Coatings were made using the polyesters prepared according to Examples 6 and 9, above. All coating ingredients as shown in the following Table 3 were stirred in from top to bottom.

TABLE 3

| | % Total Solids | 10-A Wght | 10-A NV | 10-B Wght | 10-B NV |
|---|---|---|---|---|---|
| 50/50 Dibasic esters/xylene | | 42.3 | — | 42.4 | — |
| Polyester of Ex 6 | 60.7 | 28.8 | 17.5 | — | — |
| Polyester of Ex 9 | 61.0 | — | — | 28.7 | 17.5 |
| Phenolic crosslinker[17] | 60.0 | 29.2 | 17.5 | 29.2 | 17.5 |
| Phosphoric acid | 85.0 | 0.21 | 0.18 | 0.21 | 0.18 |
| Total | | 100.5 | 35.2 | 100.5 | 35.2 |
| % TS | | 35.0 | | 35.0 | |
| % crosslinker on NV | | 50.0 | | 50.0 | |
| % Catalyst on NV | | 0.5 | | 0.5 | |

[17]Phenodur PR16, commercially available from Cytec.

Coatings were prepared to a dry coating weight of 4 mg/sq. inch by using #14 and #12 wire wound rods for the epoxy control (PPG2004877) and coatings made according to the present invention (10A and B). All coatings were applied over 0.2 ETP (electrolytic tin-plated steel) and TFS (tin-free steel) as supplied. All coated panels were baked for 12.5 minutes at 410 F for a peak metal temperature of 400 F for 10 minutes. Coated panels were cut into 2×4.5 inch plaques for wedge bend testing, and 2×4 inch plaques for testing in food simulants. Coatings were evaluated for flex by how much % spotty failure was seen along the bent radius after soaking the panels for one minute in 10% aqueous copper sulfate solution after wedge bending them. MEK rubs were done with a red rag. Pieces of the coated metal panels were immersed in various food simulants as indicated in Table 4 below and autoclaved for 60 minutes at 130° C.

TABLE 4

| Coating | Metal | Wedge Bend[A] % Spotty failure | | | | MEK DR | Pencil Hardness[B] | Dry Adh.[C] |
|---|---|---|---|---|---|---|---|---|
| | | 1 | 2 | 3 | Avg | | | |
| PPG2004877 | ETP | 9 | 7 | 10 | 9 | 90 | 2H | 100 |
| 10A | ETP | 10 | 19 | 7 | 12 | 100+ | 2H | 100 |
| 10B | ETP | 17 | 9 | 33 | 20 | 100 | H | 100 |
| PPG2004877 | TFS | 9 | 9 | 11 | 10 | 90 | 4H | 100 |
| 10A | TFS | 0 | 0 | 0 | 0 | 100+ | 4H | 100 |
| 10B | TFS | 10 | 8 | 16 | 11 | 100 | 4H | 100 |

| 30 C/60' | | | | | | | | | |
|---|---|---|---|---|---|---|---|---|---|
| DI Water | | 2% NaCl | | 1% Citrid/1% Salt | | 3% Acetic Acid | | 2% Acetic/ 3% Salt | |
| Wet Blush[D] | Wet Adh[D] | Blush | Adh | Blush | Adh | Blush | Adh | Blush | Adh |
| 0.5 | 100 | 1.0 | 90 | 0.5 | 100 | 0.5 | 100 | 1.0 | 90 |
| 0.5 | 95 | 1.0 | 20 | nt | nt | 0.5 | 80 | 0.5 | 50 |
| 1.0 | 100 | nt | nt | 1.0 | 90 | 1.0 | 95 | 1.0 | 95 |
| 0.5 | 100 | 1.0 | 100 | 1.0 | 100 | 2.0 | 100 | 1.5 | 100 |
| 0.5 | 100 | 0.5 | 95 | nt | nt | 1.0 | 25 | 1.5 | 50 |
| 0.5 | 100 | nt | nt | 0.5 | 60 | 1.0 | 90 | 1.5 | 0 |

[A]Wedge Bend, higher % spotty failure means higher failure. Test performed according to STM 0609, but using steel; after the steel test coupons were wedge bent, they were immersed in a 10% aqueous copper sulphate solution for two minutes instead of soaking them overnight.

[B]Pencil Hardness, higher number reflects a harder coating. Pencil hardness test conducted according to ASTM D 3363-92a.

[C]Dry Adhesion: 0-100 (0 = 0% stuck, 100 = 100% of the coating stuck). Dry adhesion was tested using a razor blade to scribe eleven lines parallel and perpendicular to the length of the coated metal. The resultant grid area of the scribed lines was 0.50" x 0.50" to 0.75" x 0.75" square. Adhesion was assessed by using 3M's Scotch 610 tape, which was firmly adhered over the scribed grid area by finger rubbing it multiple times prior to pulling it off. After pulling the tape off, adhesion was visually rated on a scale of 0 (complete removal of the coating) to 100% (none of the coating was removed).

[D]Blush: 0-4 scale (0 = no blush, 4 = opaque). For blush resistance and wet adhesion: Coated panels were cut into 2" x 4" coupons and placed in jars that contained DI water or various food simulants that were at room temperature. The jars contained enough test liquid to intentionally cover only half of the area of all test coupons to evaluate coating performance in the container headspace, liquid interface, and submersed areas. The jars were then sealed with aluminum foil and placed in a sterilizer for 60 minutes at 130° C. (quite severe conditions). Once the sterilizer vented and cooled down, the sealed test jars were immediately removed from the sterilizer, and the hot DI water or food simulants were discarded from the test jars and were replaced with hot tap water to completely submerse the test coupons. The test coupons were removed from the hot tap water, patted dry with lab wipes, and immediately evaluated for blush and adhesion one at a time. Blush resistance was assessed by visually looking for blush in all three areas of the test coupons and recording the rating for only the worse blushed area. Blush was rated against blush coupon standards on a scale of 0 (none) to 4 (opaque). Coating adhesion was evaluated at the center of the test coupons at the liquid interface area by using the procedure and scale described for dry adhesion.

Table 4 compares the performance of an epoxy-phenolic can coating commercially available from PPG with two coatings prepared according to the present invention. The coatings of the present invention were quite hard, yet had relatively good flexibility. As noted previously, hardness and flexibility are difficult to achieve in the same coating. Also surprising were the relatively good blush and adhesion results. Polyesters are not known in the art to perform well in these areas. Coatings prepared according to the present invention can therefore give results comparable to epoxy-phenolic coatings.

Example 11

Resin A—Comparative Example

Commercial Polyester

| Comparative Example | Parts by Weight (grams) |
|---|---|
| Neopentyl glycol | 39 |
| Isophthalic acid | 34 |
| Adipic acid | 17 |
| Trimethylol propane | 10 |
| Resin Molecular Weight | 10,900 |

Example B-1

A polyester was prepared from the following ingredients as described below:

| Ingredients | Parts by Weight (grams) |
|---|---|
| 2-Methyl-1,3-propanediol | 338 |
| Neopentyl glycol | 390 |
| Isophthalic acid | 415 |
| Adipic acid | 365 |
| Maleic anhydride | 123 |
| Butylstannoic acid | 1.63 |
| Triphenyl phosphite | 0.82 |

A total of 338 grams of 2-methyl-1,3-propanediol, 390 grams of neopentyl glycol, 415 grams of isophthalic acid, 365 grams of adipic acid, 123 grams of maleic anhydride, 1.63 grams of butylstannoic acid and 0.82 grams of triphenyl phosphite were added to a suitable reaction vessel equipped with a stirrer, temperature probe, a steam heated reflux condenser with a distillation head and a nitrogen sparge. The contents of the flask were heated to 90° C. and underwent an exotherm to 141° C. The reaction mixture was then heated to 176° C. At that time water began to be evolved from the reaction. The temperature of the reaction mixture was raised to 200° C. and then 210° C. and finally to 221° C. and held at that temperature until 200 grams of water had been distilled and the acid value of the reaction mixture was found to be 6.4. The contents of the reactor were cooled and poured out. The final material was a solid material with a measured solids of 99%, a hydroxyl value of 92.7 and a weight average molecular weight of 3440 as measured against a polystyrene standard.

Resin B

A polyester was prepared from the following ingredients as described below:

| Ingredients | Parts by Weight (grams) |
|---|---|
| Example B-1 | 500 |
| t-Butyl peroctoate (50% solution) | 10 |
| t-Butyl peroctoate (50% solution) | 10 |

| Ingredients | Parts by Weight (grams) |
|---|---|
| t-Butyl peroctoate (50% solution) | 10 |
| Dowanol PM | 132 |
| Dowanol PM Acetate | 145 |

A total of 500 grams of Example B-1 together with 132 grams of Dowanol PM were added to a suitable reaction vessel equipped with a stirrer, temperature probe, a water chilled reflux condenser and flushed with nitrogen gas. The contents of the flask were heated to 120° C. At that time, 10 grams of t-butyl peroctoate mixed with 119 grams of Dowanol PM were added to the reactor over 15 minutes. The contents of the reactor were then held at 120° C. for 1 hour. At that time, a second 10-gram aliquot of t-butyl peroctoate mixed with 13 grams of Dowanol PM was added to the reactor. The contents of the reactor were held at 121° C. for 1 hour and then a third 10-gram aliquot of t-butyl peroctoate mixed with 13 grams of Dowanol PM was added to the reactor. The reaction mixture was again held for 1 hour at 120° C. The reaction mixture was then cooled and the contents poured out. The final material was a solution with a measured solids of 64%, an acid value of 7.2, a viscosity of Z1+ and a weight average molecular weight of 91,529 as measured against a polystyrene standard.

Resin C

A polyester was prepared from the following ingredients as described below:

| Ingredients | Parts by Weight (grams) |
|---|---|
| Example B-1 | 606 |
| t-Butyl peroctoate (50% solution) | 12 |
| t-Butyl peroctoate (50% solution) | 12 |
| t-Butyl peroctoate (50% solution) | 12 |
| Dowanol PM | 210 |
| Dowanol PM Acetate | 194 |

A total of 606 grams of Example B-1 together with 194 grams of Dowanol PM Acetate were added to a suitable reaction vessel equipped with a stirrer, temperature probe, a water chilled reflux condenser and flushed with nitrogen gas. The contents of the flask were heated to 120° C. At that time, 12 grams of t-butyl peroctoate mixed with 178 grams of Dowanol PM were added to the reactor over 15 minutes. The contents of the reactor were then held at 120° C. for 1 hour. At that time, a second 12-gram aliquot of t-butyl peroctoate mixed with 16 grams of Dowanol PM was added to the reactor. The contents of the reactor were held at 1226° C. for 1 hour and then a third 12-gram aliquot of t-butyl peroctoate mixed with 16 grams of Dowanol PM was added to the reactor. The reaction mixture was held for 1 hour at 125° C. The reaction mixture was then cooled and the contents poured out. The final material was a solution with a measured solids of 61%, an acid value of 5.9, a viscosity of T and a weight average molecular weight of 24,636 as measured against a polystyrene standard.

Example D-1

A polyester was prepared from the following ingredients as described below:

| Ingredients | Parts by Weight (grams) |
|---|---|
| 2-Methyl-1,3-propanediol | 450 |
| Neopentyl glycol | 520 |
| Isophthalic acid | 1163 |
| Adipic acid | 146 |
| Maleic anhydride | 98 |
| Butylstannoic acid | 2.38 |
| Triphenyl phosphite | 1.19 |

A total of 450 grams of 2-methyl-1,3-propanediol, 520 grams of neopentyl glycol, 1163 grams of isophthalic acid, 146 grams of adipic acid, 98 grams of maleic anhydride, 2.38 grams of butylstannoic acid and 1.19 grams of triphenyl phosphite were added to a suitable reaction vessel equipped with a stirrer, temperature probe, a steam heated reflux condenser with a distillation head and a nitrogen sparge. The contents of the flask were heated to 90° C. and underwent an exotherm to 141° C. The reaction mixture was then heated to 179° C. At this time water began to be evolved from the reaction. The temperature of the reaction mixture was raised to 200° C. and then 210° C. and finally to 221° C. and held at that temperature until 300 grams of water had been distilled and the acid value of the reaction mixture was found to be 9.5. The contents of the reactor were cooled and poured out. The final material was a solid material with a measured solids of 99%, a hydroxyl value of 54.6 and a weight average molecular weight of 4,903 as measured against a polystyrene standard.

Resin D

A polyester was prepared from the following ingredients as described below:

| Ingredients | Parts by Weight (grams) |
|---|---|
| Example D-1 | 601 |
| t-Butyl peroctoate (50% solution) | 6 |
| Dowanol PM | 160 |
| Dowanol PM Acetate | 148 |

A total of 601 grams of Example D-1 together with 160 grams of Dowanol PM and 136 grams of Dowanol PM Acetate were added to a suitable reaction vessel equipped with a stirrer, temperature probe, a water chilled reflux condenser and flushed with nitrogen gas. The contents of the flask were heated to 120° C. At that time, 6 grams of t-butyl peroctoate mixed with 12 grams of Dowanol PM Acetate were added to the reactor over 15 minutes. The contents of the reactor were then held at 120° C. for 1 hour. The reaction mixture was then cooled and the contents poured out. The final material was a solution with a measured solids of 69%, an acid value of 7.1, a viscosity of Z1-Z2 and a weight average molecular weight of 12,744 as measured against a polystyrene standard.

Example E-1

A polyester was prepared from the following ingredients as described below:

| Ingredients | Parts by Weight (grams) |
|---|---|
| 1,4-Cyclohexanedimethanol | 1268 |
| Neopentyl glycol | 333 |
| Isophthalic acid | 333 |
| Hexahydrophthalic anhydride | 925 |
| Maleic anhydride | 196 |
| Butylstannoic acid | 3.05 |
| Triphenyl phosphite | 1.53 |

A total of 1268 grams of 1,4-cyclohexanedimethanol, 333 grams of neopentyl glycol, 333 grams of isophthalic acid, 924 grams of hexahydrophthalic anhydride, 196 grams of maleic anhydride, 3.05 grams of butylstannoic acid and 1.53 grams of triphenyl phosphite were added to a suitable reaction vessel equipped with a stirrer, temperature probe, a steam heated reflux condenser with a distillation head and a nitrogen sparge. The contents of the flask were heated to 90° C. and underwent an exotherm to 161° C. The reaction mixture was then heated to 192° C. At this time water began to be evolved from the reaction. The temperature of the reaction mixture was raised to 200° C. and then 210° C. and finally to 221° C. and held at that temperature until 210 grams of water had been distilled and the acid value of the reaction mixture was found to be 10.9. The contents of the reactor were cooled and poured out. The final material was a solid material with a measured solids of 99.9%, a hydroxyl value of 68.5 and a weight average molecular weight of 3,254 as measured against a polystyrene standard.

Resin E

A polyester was prepared from the following ingredients as described below:

| Ingredients | Parts by Weight (grams) |
|---|---|
| Example E-1 | 1503 |
| t-Butyl peroctoate (50% solution) | 30 |
| Dowanol PM | 492 |
| Dowanol PM Acetate | 453 |

A total of 1503 grams of Example E-1 together with 492 grams of Dowanol PM Acetate were added to a suitable reaction vessel equipped with a stirrer, temperature probe, a water chilled reflux condenser and flushed with nitrogen gas. The contents of the flask were heated to 120° C. At that time, 30 grams of t-butyl peroctoate mixed with 453 grams of Dowanol PM were added to the reactor over 15 minutes. The contents of the reactor were then held at 120° C. for 1 hour. The reaction mixture was then cooled and the contents poured out. The final material was a solution with a measured solids of 61%, an acid value of 7.9, a viscosity of Z2+ and a weight average molecular weight of 90,628 as measured against a polystyrene standard.

Example 12

Table 5 shows the composition and molecular weight of each free radical polyester resin made as replacement resins for CAB and standard polyester resins in solvent basecoats. The standard resin is Polyester Resin A. Polyesters were made with various levels of hard and soft monomers and with high vs. low molecular weight.

TABLE 5

| POLYESTER RESIN | % Neopentyl Glycol | % Isophthalic Acid | % Adipic Acid | % Trimethylol Propane | % Hexahydro Phthalic Anhydride | % Cyclohexane dimethanol | % 2-Methyl-1,3-propanediol | % Maleic Anhydride | GPC $M_w$ |
|---|---|---|---|---|---|---|---|---|---|
| Polyester Resin A | 39.0 | 34.0 | 17.0 | 10.0 | 0 | 0 | 0 | 0 | 10,900 |
| Polyester Resin B | 23.9 | 25.5 | 22.4 | 0 | 0 | 0 | 20.7 | 7.5 | 91,500 |
| Polyester Resin C | 23.9 | 25.5 | 22.4 | 0 | 0 | 0 | 20.7 | 7.5 | 24,600 |
| Polyester Resin D | 21.8 | 48.9 | 6.1 | 0 | 0 | 0 | 18.9 | 4.1 | 12,700 |
| Polyester Resin E | 10.9 | 10.9 | 0 | 0 | 30.2 | 41.4 | 0 | 6.4 | 90,600 |

Silver metallic basecoats were made according to the Examples in Table 5. The free radical polyester resins replaced both the CAB 381-0.5 resin and the standard Polyester Resin A. The basecoats were applied using a SPRAYMATION machine onto 4 inch by 12 inch steel panels coated with cured ELECTROCOAT (ED 6060C) and a commercially available PPG primer (HP 77224ER). These substrate panels are available from ACT Test Panels, Inc. of Hillsdale, Mich.

A SPRAYMATION machine was used to apply the various coatings. The basecoats were applied in two coats followed by a three minute room temperature flash before two coats of a commercially available PPG Clear (HIGH TECH) was applied with a one minute room temperature flash between coats. The composite coating was allowed to flash for ten minutes at room temperature before baking for thirty minutes at 285° F.

TABLE 6

| Component | Example A | Example B | Example C | Example D | Example E |
|---|---|---|---|---|---|
| Ethyl 3-Ethoxypropionate[18] | 40.0 | 40.0 | 40.0 | 40.0 | 40.0 |
| AROMATIC 100[19] | 25.0 | 25.0 | 25.0 | 25.0 | 25.0 |
| Butyl Acetate[20] | 87.3 | 86.5 | 70.0 | 70.0 | 87.0 |
| Acrylic Microgel Resin[21] | 26.0 | 26.0 | 26.0 | 26.0 | 26.0 |
| CAB 381-20 Solution[22] | 42.8 | 42.8 | 42.8 | 42.8 | 42.8 |
| CAB 381-0.5 Solution[23] | 28.5 | 0 | 0 | 0 | 0 |
| Polyester Resin A | 71.9 | 0 | 0 | 0 | 0 |
| Polyester Resin B | 0 | 79.0 | 0 | 0 | 0 |
| Polyester Resin C | 0 | 0 | 82.9 | 0 | 0 |
| Polyester Resin D | 0 | 0 | 0 | 73.5 | 0 |
| Polyester Resin E | 0 | 0 | 0 | 0 | 82.6 |
| Dow Corning 56 Solution[24] | 2.2 | 2.2 | 2.2 | 2.2 | 2.2 |
| LUWIPAL 018 Melamine Resin[25] | 34.2 | 34.2 | 34.2 | 34.2 | 34.2 |
| RESAMIN HF 480 Resin[26] | 5.0 | 5.0 | 5.0 | 5.0 | 5.0 |
| Aluminum Paste 634A[27] | 16.9 | 16.9 | 16.9 | 16.9 | 16.9 |
| CERAFAX 106A[28] | 64.7 | 64.7 | 64.7 | 64.7 | 64.7 |
| TOTAL (grams) | 444.5 | 422.3 | 409.7 | 400.3 | 426.4 |

[18]Solvent available from EASTMAN CHEMICAL.
[19]Solvent available from EXXON Corporation.
[20]Solvent available from EASTMAN CHEMICAL.
[21]Acrylic micro-particle as described in Example II of U.S. Pat. No. 4,147,688A.
[22]Cellulose Acetate Butyrate Resin available from EASTMAN CHEMICAL dispersed in (77.4/13.6 ratio) Butyl Acetate and Butanol to a 9% solution.
[23]Cellulose Acetate Butyrate Resin available from EASTMAN CHEMICAL dispersed in Butyl Acetate to a 20% solution.
[24]Silicone Fluid available from DOW CORNING Corporation dispersed in AROMATIC 100 to a 10% solution.
[25]Melamine-Formaldehyde resin solution available from BASF Corporation.
[26]Butylurethane-Formaldehyde resin solution available from CYTEC SURFACE SPECIALTIES.
[27]Aluminum Paste available from TOYO ALUMINUM K. K.
[28]Wax dispersed in solvent available from BYK-CERA B. V.

Table 7 provides a summary of the appearance and physical properties obtained for each of the Examples. The Examples were all baked in the vertical position. Example A is the standard basecoat using CAB 381-0.5 and the standard polyester resin. All other examples contain a free radical polyester resin according to the present invention. The free radical polyester resins with both hard monomers and with the highest molecular weight provide acceptable color, higher spray solids, equivalent hardness and excellent appearance compared to Example A. Higher Flop Index and higher L15 color numbers are preferred for the light face effect provided by Aluminum containing basecoats. A lower L110 value is preferred for the dark flop color effect. Higher gloss and DOI values are preferred for clear appearance over the silver metallic basecoat. Lower Long Wave and Short Wave values are preferred for a smooth clear appearance.

The results presented in Table 7 demonstrate that coatings having a greatly increased molecular weight but a low viscosity can be made according to the present invention, and that such coatings have good appearance.

Whereas particular embodiments of this invention have been described above for purposes of illustration, it will be evident to those skilled in the art that numerous variations of the details of the present invention may be made without departing from the invention as defined in the appended claims.

What is claimed is:

1. A process for preparing an ungelled, branched, cross-linkable polyester resin having a hard segment comprising:
   (a) reacting an unsaturated polycarboxylic acid or anhydride or ester thereof with a polyol and with a monomer

TABLE 7

| Basecoat | Basecoat Viscosity # 4 Ford Cup (seconds) | Basecoat Calculated % Weight Solids | Film Thickness[29] (mils) Basecoat | Film Thickness[29] (mils) Clear | Fischer Hardness[30] (N/mm²) | X-Rite Color[31] Flop Index | X-Rite Color[31] L15 | X-Rite Color[31] L110 | 20° Gloss[32] | DOI[33] | BYK WAVESCAN[34] Long Wave | BYK WAVESCAN[34] Short Wave |
|---|---|---|---|---|---|---|---|---|---|---|---|---|
| EXAMPLE A | 17.7 | 25.2 | 0.62 | 1.48 | 132 | 17.5 | 148.6 | 27.2 | 102 | 76 | 8.1 | 26.3 |
| EXAMPLE B | 17.3 | 26.6 | 0.64 | 1.50 | 124 | 16.6 | 146.8 | 27.5 | 101 | 73 | 8.4 | 27.2 |
| EXAMPLE C | 17.0 | 27.4 | 0.61 | 1.51 | 124 | 16.3 | 145.6 | 27.6 | 101 | 71 | 7.3 | 31.0 |
| EXAMPLE D | 17.0 | 28.0 | 0.60 | 1.51 | 132 | 13.2 | 137.0 | 30.4 | 100 | 83 | 6.9 | 30.0 |
| EXAMPLE E | 16.8 | 26.3 | 0.60 | 1.50 | 132 | 17.6 | 149.1 | 25.8 | 101 | 79 | 5.5 | 24.5 |

[29]Dry film thickness measured using FISCHER DELTACOPE made by FISCHER TECHNOLOGY, INC. of Windsor, CT.
[30]Microhardness Instrument available from Helmut Fischer GMBH & Company of Sindelfingen, Germany.
[31]X-Rite Color Instrument model number MA68II manufactured by X-Rite, Inc. of Grandville, Michigan.
[32]NOVO GLOSS statistical 20° Glossmeter available from Paul N. Gardner Company, Inc. of Pompano Beach, Florida.
[33]DOI meter manufactured by TRICOR Systems, Inc. of Elgin, Illinois.
[34]BYK WAVESCAN DOI instrument manufactured by BKY Gardner USA of Columbia, Maryland.

contributing a hard segment to form an unsaturated polyester prepolymer containing terminal hydroxyl groups, (b) subjecting the unsaturated polyester prepolymer to free radical polymerization via the unsaturation to form an ungelled, branched, crosslinkable polyester resin that has terminal hydroxyl groups and that has a higher molecular weight than the prepolymer such that the weight average molecular weight ratio of the polyester resin to the prepolymer is 1.2 to 100.

2. The process of claim 1 in which the unsaturated polyester prepolymer comprises more than one polyester prepolymers.

3. The process of claim 2 in which the unsaturated polyester prepolymer comprises a mixture of different polyester prepolymers.

4. The process of claim 1, wherein the monomer contributing a hard segment comprises an aromatic and/or cycloaliphatic polyacid.

5. The process of claim 4, wherein the monomer contributing a hard segment comprises isophthalic acid.

6. The process of claim 4, wherein the monomer contributing a hard segment further comprises benzoic acid.

7. The process of claim 1, wherein the polyol comprises 2-methyl-1,3-propanediol and/or neopentyl glycol.

8. The process of claim 1, wherein the unsaturated polycarboxylic acid or anhydride or ester thereof comprises maleic acid or anhydride or ester thereof.

9. The process of claim 1, wherein the monomer contributing a hard segment comprises isophthalic acid, the polyol segment comprises 2-methyl-1,3-propanediol and/or neopentyl glycol, and the unsaturated polycarboxylic acid or anhydride or ester thereof comprises maleic acid or anhydride or ester thereof.

10. The process of claim 1, wherein the Mw of the ungelled, branched, crosslinkable polyester resin is 15,000-50,000.

11. The process of claim 1, wherein the viscosity of the ungelled, branched, crosslinkable polyester resin is Z or less at 60% total solids as measured by the Gardner-Holt bubble method.

12. The process of claim 1, wherein the ungelled, branched, crosslinkable polyester resin has a weight average molecular weight greater than 1000 and up to 10,000,000.

13. The process of claim 1, wherein the free radical polymerization is carried out by adding a free radical initiator, the molar ratio of the initiator to degree of unsaturation is in a range from 0.001 to 1.0.

14. The process of claim 1, wherein the free radical polymerization is carried out by adding a free radical initiator, the initiator added in portions at different times or in a continuous feed during the polymerization.

15. The process of claim 1, wherein the weight average molecular weight ratio of the ungelled, branched, crosslinkable polyester resin to the unsaturated polyester prepolymer is in a range from 1.2 to 500.

16. The process of claim 12, wherein the weight average molecular weight ratio of the ungelled, branched, crosslinkable polyester resin to the unsaturated polyester prepolymer is in a range from 1.2 to 500.

* * * * *